United States Patent [19]
Schwarz

[11] Patent Number: 5,788,149
[45] Date of Patent: Aug. 4, 1998

[54] SYSTEM FOR SUPPLYING CONSUMERS WITH HEAT ENERGY, AND APPARATUS THEREFOR

[75] Inventor: Alois Schwarz, Kirchdorf/Tirol, Austria

[73] Assignee: Eri Energie-Ressourcen Institut Forschungs- und Entwicklungs-GmbH, Kirchdorf/Tirol, Austria

[21] Appl. No.: 555,114

[22] Filed: Nov. 8, 1995

[30] Foreign Application Priority Data

Nov. 8, 1994 [AT] Austria .................................. 2067/94

[51] Int. Cl.[6] .................................................. G05D 23/00
[52] U.S. Cl. .................................... 237/2 B; 237/8 R
[58] Field of Search ........................ 237/8 R, 19, 2 A

[56] References Cited

U.S. PATENT DOCUMENTS

| | | | |
|---|---|---|---|
| 3,889,878 | 6/1975 | Evans | 237/8 R |
| 4,184,477 | 1/1980 | Yuan | 126/433 |
| 4,327,705 | 5/1982 | Steutermann | 126/422 |
| 4,978,063 | 12/1990 | Chase | 237/19 |

*Primary Examiner*—Henry A. Bennett
*Assistant Examiner*—Derek S. Boles
*Attorney, Agent, or Firm*—Herbert L. Lerner; Laurence A. Greenberg

[57] ABSTRACT

The system allows selective supply of heat energy to consumers at different temperature levels. A carrier medium heated in at least one heat source such as an environmental collector and a heat pump. An outlet line of the heat source communicates with the inlet of at least one distributor. The distributor has several outlets communicating with flow lines leading to the consumers. The distributor selects the flow line through which the heated carrier medium is to be transported, i.e. which one of the consumers is to be supplied with heat energy.

19 Claims, 3 Drawing Sheets

SYSTEM FOR SUPPLYING CONSUMERS WITH HEAT ENERGY, AND APPARATUS THEREFOR

BACKGROUND OF THE INVENTION

Field of the Invention

The invention relates to a system for supplying consumers with heat energy, wherein the system has a carrier medium which is heated in at least one heat source. The present invention also relates to distributor devices and collector devices for such a system, and to an apparatus which includes such distributor devices and collector devices, and which regulates and controls the supply of heated carrier medium to consumers.

Environmental collectors, such as solar collectors, waste heat collectors, ground reservoirs, and the like, have been known heretofore in the supply of heat energy to consumers. Carrier media from such collectors are usually at a relatively low temperature level. In order to attain a temperature level that meets the demands for heat energy consumers, it has been known to raise the heat energy density, i.e. to raise the temperature of the carrier medium to a high temperature, by means of heat pumps.

Since many technical aspects must be addressed in supplying consumers with heat energy, however, the systems known thus far have not met the technical and organizational demands made of them, and for this reason the use thereof is severely limited:

For instance, the efficiency of environmental collectors, especially solar collectors, is optimal if these collectors are supplied with the carrier medium at a low enough temperature, because only in this way can a large temperature difference be utilized by the environmental collectors so that a satisfactory amount of heat energy can be recovered. However, it must be noted that in the majority of environmental collectors, the amount of heat available varies over time. The heat energy that can be removed in environmental collectors depends for instance on the outdoor temperature at the time, which is substantially higher in the summer than in the winter and as a rule is higher during the day than at night. The heat energy that can be recovered by means of solar collectors also depends on the position of the sun relative to the solar collector and on the weather. These aspects are similarly applicable to heat collectors of the kind in which the waste heat is recovered from production processes or processing operations, since the amount of heat depends on the course over time of these operations.

This presents the difficulty that the periods of time in which heat is offered by heat collectors do not coincide with the periods in which consumers of heat energy demand heat, resulting on the one hand in an oversupply of heat energy recovered by heat collectors and on the other in heat consumption that is not covered by the heat collectors.

It must also be taken into account that the carrier medium is simultaneously output at different temperature levels from different heat collectors, such as solar collectors, environmental collectors, and heat reservoirs. The carrier medium output from the various heat sources must therefore never be mixed together, because that would mean that whichever carrier medium is at the highest temperature level would be cooled down to a lower temperature level, with an attendant loss of heat potential. Accordingly, it must be assured that the carrier medium arriving from different heat sources at different temperature levels must be carried to particular consumers of heat energy that are set for those temperature levels.

If a given temperature level is raised by a heat pump to a higher temperature level, to enable supplying certain consumers of heat energy with the heat energy they demand at a high temperature level, then it must also be taken into account that the efficiency of heat pumps is optimal whenever they are supplied with the carrier medium at a temperature value that is within narrow limits. Moreover, heat pumps require continuous operation for relatively long periods of time, that is, for at least one hour. Frequent on/off switching of heat pumps must be avoided, because otherwise their service life is greatly shortened. A further aspect is that the maximum capacity of heat pumps must be designed such that they can cover the demand for heat energy even if the supply of heat energy recovered from environmental collectors is low.

Another aspect that must be taken into account in such systems is that in various kinds of buildings (especially in hotels, apartment buildings, commercial facilities and factories), not only heat energy but also negative heat energy (heat removal) is required. In the cold time of the year, especially in winter, heat energy is needed for heating purposes; and over the entire year, heat energy is needed for heating general-purpose water for cleaning uses, for swimming pools, for air-conditioning of rooms, and so forth. All year, negative heat energy is needed for cooling purposes, such as in refrigeration systems for the storage of foods. Since such systems as a rule are located in central regions of buildings, it has been found that the demand for cooling energy in winter is at least as high or even higher than in the summer. The reason for this is that in winter, such buildings are heated, and that heating energy also reaches the refrigeration rooms.

SUMMARY OF THE INVENTION

It is accordingly an object of the invention to provide a system for supplying consumers with heat energy and an apparatus therefor, which has a carrier medium heated in at least one heat source, which overcomes all of the above-mentioned disadvantages of the heretofore-known devices of this general type and which meets the technical and organizational demands made of it.

With the foregoing and other objects in view there is provided, in accordance with the invention, a system for supplying consumers with heat energy at relatively different temperature levels, comprising:

at least one heat source and a carrier medium heated in the heat source;

at least one distributor having an inlet communicating with the heat source and being formed with a plurality of outlets;

a plurality of flow lines respectively connected to the outlets of the distributor, the flow lines supplying heat energy to consumers of heat energy at relatively different temperature levels, the distributor selecting one of the consumers to which the carrier medium heated in the heat source is to be delivered.

In other words, the objects of the invention are satisfied in that the outlet line of the at least one heat source is connected to the inlet of an associated distributor device, and that the distributor device is embodied with a plurality of outlets to which the flow lines to consumers of heat energy at a different temperature level are connected. The distributor device allows the selection of individual consumers to which the heated carrier medium can be delivered.

In accordance with an added feature of the invention, the consumers of heat energy at different temperature level are connected in series, such that the carrier medium flows therethrough in succession. Assuming a heat exchange per heat exchanger at a given consumer of, say, $\Delta T=15°$ C., it is easily possible in this regard to supply several consumers in series before the carrier medium reaches a low temperature level which allows reheating at the heat source, such as a solar collector, an environmental collector, or a ground reservoir.

In accordance with an additional feature of the invention, the solar collector is one of at least two solar collectors, the at least two solar collectors being aimed in mutually different directions. In addition, there may be provided a heat pump as outlined below. A preferred heat pump includes an evaporator, a compressor, and a condenser. The evaporator thereby communicates with a cooling apparatus, i.e. a consumer for negative heat energy.

In accordance with a further feature of the invention, the system includes a collection header formed with a single outlet line and with inlets connected to inlet lines from consumers at a relatively low temperature level; the heat pump thereby has an inlet communicating with the single outlet line of the collection header, and a collection header defines which respective consumer is to be connected to the inlet of the heat pump. Preferably, the system includes a further collection header, the evaporator of the heat pump may communicate with the return lines from the consumers of heat energy at the relatively low temperature level via the collection header, and the condenser of the heat pump selectively communicates with the return lines from the consumers of heat energy at a relatively high temperature level via the further collection header.

In accordance with again an added feature of the invention, the system also has a further distributor having an inlet communicating with an outlet of the heat pump, the further distributor being formed with a plurality of outlets leading to consumers at a relatively high temperature level, the further distributor selectively supplying carrier medium from the heat pump to one of the consumers at the relatively high temperature level. Preferably, the system includes another distributor having an inlet communicating with a return line of a consumer of negative heat energy, the other distributor having a plurality of outlets communicating with consumers at the relatively low temperature level, the other distributor selectively connecting one of the consumers at the relatively low temperature level for receiving the carrier medium heated in the consumer of negative heat energy.

In accordance with again an additional feature of the invention, the plurality of heat sources include an environmental collector, and the system further comprises a mixing valve connected in the return line of the consumer of negative heat energy, the mixing valve further communicating with the environmental collector and with the evaporator of the heat pump.

In accordance with yet an added feature of the invention, there is provided a distributor assembly for use in the above system. The distributor assembly for selectively supplying the heat energy to the consumers comprises a housing formed with at least one inlet for receiving the carrier medium from the at least one heat source and with a plurality of outlets adapted to be connected to the flow lines for the consumers of heat at relatively different temperature levels, at least one distributor connected between the at least one inlet and the plurality of outlets, and a control device operatively connected to the distributor for selectively connecting the inlet with one of the outlet conduits. The control device includes a rotatable disk having a bore formed therein, and a control motor rotating the disk, the control motor being means for selecting one of the inlet conduits.

There is also provided a collector assembly for use in the above system. The collector assembly comprises: a housing formed with a plurality of inlet conduits for receiving the carrier medium from the consumers of heat energy and with an outlet conduit leading to a heat pump, at least one collection header connected between the inlet conduits and the outlet conduit, and a control device associated with the collection header for selectively defining one of the inlet conduits to be connected for supplying the carrier medium to the heat pump.

As in the distributor device, the control device includes a rotatable disk with a bore formed therein and a control motor.

In both the distributor assembly and the collector assembly there may be provided a control cylinder connected to the rotatable disk, the control cylinder, following a rotation of the disk, sealingly placing the disk against a respectively selected inlet conduit.

With the objects of the invention in view there is also provided an apparatus for controlling the supply of heat energy to consumers with a heated carrier medium, comprising: a housing formed with fluidic connections for receiving heated carrier medium from at least one heat source and for supplying the heated carrier medium to a plurality of consumers of heat energy, at least one distributor disposed in the housing and connected between the fluidic connections for receiving and supplying the carrier medium, the distributor selecting a particular conduit through which the heated carrier medium is supplied to one of the plurality of consumers. The apparatus may include at least one collection header disposed in the housing, the collection header being formed with an outlet to be connected to a heat pump.

In accordance with a concomitant feature of the invention, there are provided four distributors disposed in the housing, and two collection headers, the distributors and the collection headers being connected to one another through conduits and are connected to heat sources and to consumers of heat energy and negative heat energy respectively via connecting bores, the distributors and the collection headers controlling a distribution of heat energy and negative heat energy to and from the consumers with a carrier medium flowing in from the heat sources.

The novel distributor device thus assures that the carrier medium output by the specified heat source is supplied to the particular consumer or group of consumers of heat energy, i.e. to the consumer which matches the particular temperature level output by the particular heat source.

Preferably, the consumers of heat energy at different temperature levels are connected in series, as a result of which the carrier medium can flow therethrough in succession. Radiators, dishwashers, washing machines, clothes dryers, hot water heaters and floor heating systems can be named as examples of heat energy through which the heated carrier medium flows and which are connected individually or optionally in series; in the process, the carrier medium gives up its heat energy to consumers and is thereby cooled.

Examples of heat sources that may be named are environmental collectors, especially solar collectors, waste heat collectors, heat reservoirs, especially ground reservoirs, and the like. If two solar collectors are provided, which are aimed in different directions, then they give up the carrier medium at different temperature levels. Since each of these heat sources is assigned its own distributor device, the carrier medium is directed by means of the respect distributor device to whichever consumer or group of consumers is set to the particular temperature level that the carrier medium output by the associated collector has. As a result, the heat energy is extracted from the carrier medium.

Moreover, further consumers for heat energy at a low temperature level, such as pipelines laid in inside walls, in further floors, in outside walls and the like, may be provided, into which the low temperature carrier medium is introduced, as a result of which on the one hand the heat energy contained in it is stored and on the other insulation is brought about, thus enabling climate control of rooms. Moreover, at least one energy reservoir, such as a ground reservoir, may also be provided.

Preferably, the system includes a further heat source in the form of a heat pump. At least one collector device for feeding the heat pump is provided, at whose inlets the return lines of the consumer or consumer groups at a different temperature level are connected, and whose only outlet is connected to the inlet of the heat pump. This makes it possible to take into account the fact that a heat pump functions with optimal efficiency as long as it is supplied with a carrier medium that has a narrowly defined temperature value. By means of the collector device, the particular return line from a consumer or consumer group or one among the plurality of consumers or consumer groups that consume the heat energy can be selected that has the carrier medium at the temperature level required for the heat pump, and this medium is carried to the heat pump. In the heat pump, the temperature level of the carrier medium is raised to the value required for supplying the heat energy consumer. The carrier medium is fed via a distributor device associated with the heat pump, and the particular consumer that is to be supplied with heat energy from the heat pump can be selected with that device.

The storage of excess heat energy takes place in the energy reservoir, and that heat can then be extracted whenever too little heat energy is output by the environmental collectors.

Other features which are considered as characteristic for the invention are set forth in the appended claims.

Although the invention is illustrated and described herein as embodied in a system for supplying consumers with heat energy and an apparatus therefor, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
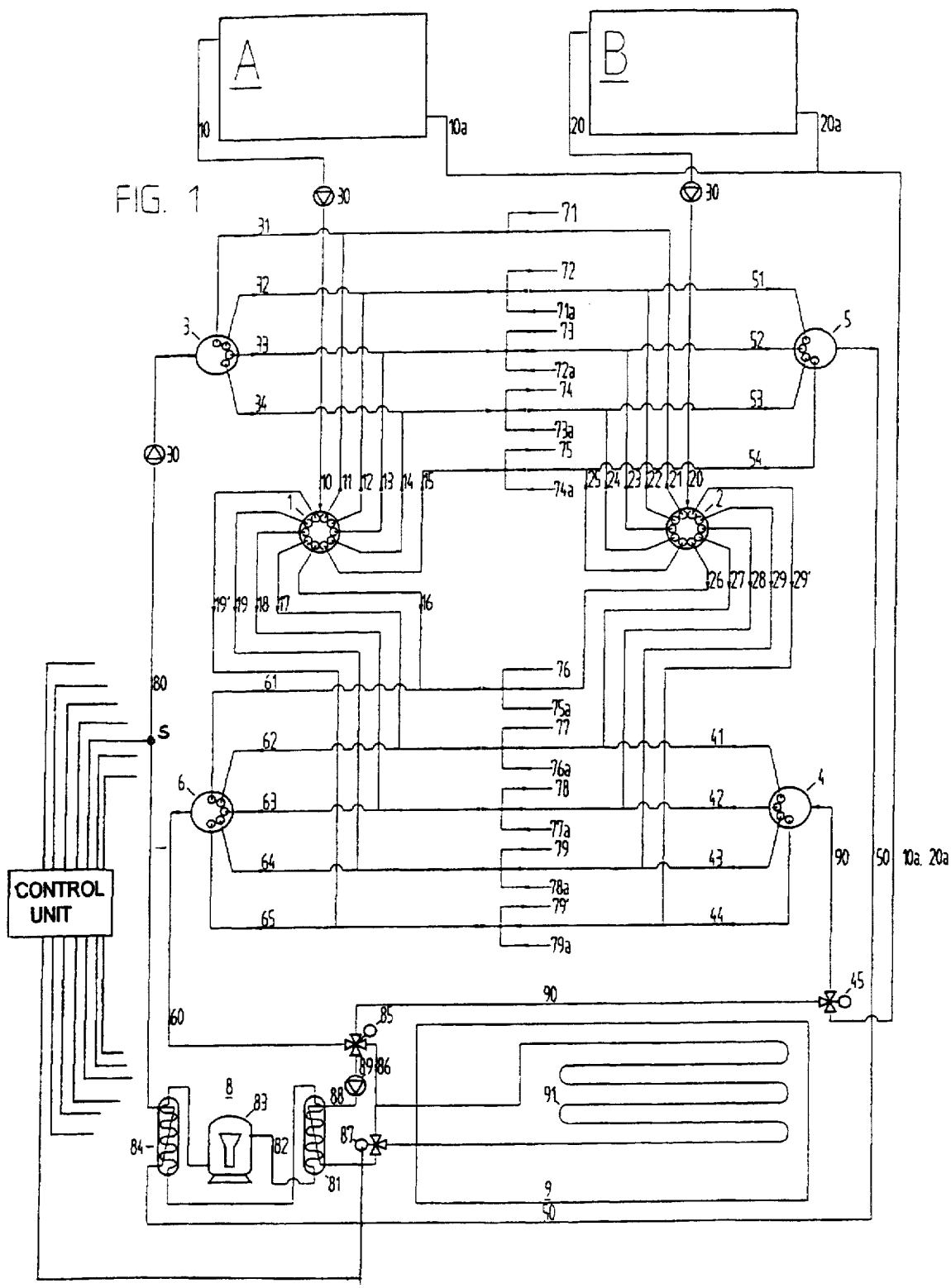
FIG. 1 is a schematic view of a system according to the invention.

Referring now to the figures of the drawing in detail and first, particularly, to FIG. 1 thereof, there is seen a system according to the invention which includes two distributors 1 and 2. The distributors 1 and 2 have individual inlets which communicate with outlet lines 10 and 20 of two heat sources A and B. The heat sources are embodied, by way of example, as environmental collectors, such as solar collectors A and B, waste heat collectors, ground reservoirs, or the like. The lines 11–19' and 21–29' connected to the outlets of the respective distributors 1 and 2 are connected to flow lines 71–79' for consumers of heat energy at different temperature levels. The return lines 71a–79a from the consumers are each connected to the flow lines of the next consumer of heat energy in series. Thus the return line 71a is connected to the flow line 72 for a second consumer of heat energy.

The flow lines 71–75 lead to a first group of five consumers of heat energy at a high temperature level of approximately 80° C. to approximately 30° C., such as, first, radiators; second, machines such as dishwashers, washing machines, dryers and the like; third and fourth, hot water heaters; and fifth, floor heaters. The flow lines 76–79 lead to a second group of consumers of heat energy at a low temperature level of approximately 25° C. to 20° C., such as lines in inside walls, inside floors, outer walls, and in two different ground reservoirs.

In addition, a third distributor 3 and a fourth distributor 4 are provided. The return line 80 of a heat pump 8 is connected to the single inlet of the third distributor 3. The outlet lines 31–34 of the third distributor 3 lead to the flow lines 71–74 of the consumers of heat energy at a high temperature level. A line 90 that comes from a refrigeration system 9 is connected to the single inlet of the fourth distributor 4. The outlet lines 41–44 of the fourth distributor are connected to the flow lines 77–79' of the consumers of heat energy at a low energy level.

Two collection headers 5 and 6 are also provided. The inlet lines 51–54 of the first collection header 5 are connected to the outlet lines 12–16 and 22–26 of the two distributors 1 and 2 that lead to the flow lines 72–75 for consumers of heat at a high temperature level. The sole outlet line 50 of the first collection header 5 leads to the heat pump 8. The inlet lines 61–65 of the second collection header 6 are connected to the lines 16–19' of the first distributor 1 and the lines 26–29' of the second distributor 2 that lead to the flow lines 76–79' to consumers at a low temperature level. The sole outlet line 60 leads to the heat pump 8.

The heat pump 8 includes an evaporator 81 and a condenser 84; the outlet of the evaporator is connected to a compressor 83 via a line 82. The line 60 leading from the collection header 6 to the heat pump 8 includes a mixing device 85, which communicates by means of a line 86 with a three-way valve 87. A pump 89 is also located in a line 88 that leads from the mixing valve 85 to the evaporator 81. The refrigeration system 9 includes a cooling coil 91, which is connected to the mixing device 85 and to the three-way valve 87.

Located in the line 90 that leads from the three-way valve 85 to the distributor 4 is a mixing valve 45, to which lines 10a and 20a that lead back to the solar collectors A and B are connected.

Instead of the second solar collector B, an environmental collector or a ground reservoir may also be provided. Pumps 30 are disposed in most of the lines.

The mode of operation of this system is as follows: Heated carrier medium is supplied to the first distributor 1 via the outlet line 10 of the first solar collector A. Depending on the temperature of the carrier medium, the medium is supplied via one of the outlet lines 11–19' to whichever consumer of heat energy is set for the currently available temperature. For instance, if the solar collector A outputs carrier medium at a temperature of approximately 80° C., then the medium is supplied via the distributor 1 through the line 11 to the flow line 71 for the consumer that has the highest temperature level, such as a group of radiators. Conversely, if the first solar collector A outputs carrier medium at a temperature of 30° C., then it is supplied via the first distributor 1 through the line 15 to the flow line 75 to the floor heating system. At a still lower level, the carrier medium is supplied by means of the first distributor 1 via one of the lines 16–19' to one of the flow lines 76–79' to one of the low temperature consumers.

In an analogous way, the supplied, heated carrier medium from the second solar collector B is delivered, depending on its temperature, via the outlet line 20 of the second distributor 2 via one of the lines 21–25 to one of the flow lines 71–75 leading to one of the consumers of heat at a high temperature, and via one of the lines 26–29' to one of the flow lines 76–79' to one of the consumers of heat at a low temperature level.

The distributors 1 and 2 thus assure that the carrier medium will reach the particular consumers that are set to the temperature of that carrier medium. Since the return lines 71a–79a of the consumers of heat energy are connected to the flow lines of the next consumer in sequence, the carrier medium can be passed through the further consumers as a function of the heat requirements. As a result, the heat energy contained in it is given up to these further consumers.

However, if there is a need to feed additional heat energy into the system, then via one of the lines 51–54 from the two collectors A and B or from the consumers at a high temperature level, inflowing carrier medium is carried via the first collection header 5 and via the line 50 (leading to the heat pump 8) to the condenser 84 of the heat pump 8. In the condenser 84, the temperature of the carrier medium is raised to the particular temperature value required in one of the consumers for heat at a high temperature level. By means of the third distributor 3, via one of the lines 31–34 to one of the flow lines 71–74 for consumers at a high temperature level, carrier medium output by the heat pump 8 is supplied at a temperature of 80° C. to 30° C. Since the heat pump 8 is supplied with carrier medium at a high temperature level via the first collection header 5, the temperature thereof can be raised by the heat pump 8 to the required high temperature values.

By means of the second collection header 6, carrier medium is supplied to the evaporator of the heat pump 8 via the distributors 1 and 2 from the solar collectors A and B or from one of the consumers of heat at a low temperature level. Because of the selection—made possible by the second collection header 6—of which of the collectors or consumers will be the source of inflowing carrier medium to be supplied to the heat pump 8, it is possible to take into account the fact that the efficiency of the heat pump 8 is optimized whenever the heat pump 8 is supplied with the carrier medium at a temperature withing a relatively narrowly defined temperature range, for instance at 30° C.

The cold carrier medium output by the evaporator 81 of the heat pump 8 is supplied via the three-way valve 87 to the cooling coil 91 of the refrigeration system 9. The return flow from the refrigeration system 9 can be mixed with the incoming flow via the three-way valve 87. Moreover, the return flow from the refrigeration system 9 can be added via the mixing valve 85 to the incoming flow for the evaporator 81. As a result, the temperature of the carrier medium supplied to the refrigeration system 9 can be controlled. Also, the return flow from the refrigeration system 9 is brought via the mixing valve 85 and the line 90 to the inlet of the fourth distributor 4, from which, via one of the lines 41–44, it reaches the flow lines 77–79' leading to one of the low-temperature heat consumers. Since the return flow lines 75a–79a are connected to the mixing valve 85 via the collection header 6 and its outlet line 60, carrier medium at a low temperature can be fed from one of the low-temperature consumers into the refrigeration system.

Temperature sensors S are disposed in the various lines with which the temperatures of the carrier medium located in these lines are measured. The outputs of the temperature sensors are carried to a central control unit. Moreover, all the data required for operation of the system, such as the outdoor temperatures, the heat demand of the individual consumers, and the like, are fed into the central control unit. By means of a control program, the distributors and the collection headers are controlled such that as a function of the supply of heat energy and the demand for heat energy, optimal utilization of the system is assured. FIG. 1 further shows an exemplary connection from the control unit to the valve 87, indicating that the various valves are regulated as well. Since carrier medium at very low temperatures is returned to the solar collectors A and B, their efficiency is optimized. From the solar collectors A and B, the heated carrier medium is supplied to those consumers that are to be acted upon at a corresponding temperature. By connecting the consumers of heat energy of different temperature levels in series with one another, the heat energy contained in the carrier medium is utilized completely. Excess heat energy is stored in one of the heat reservoirs, and if not enough heat energy is supplied by the environmental collectors, it can be made up by extracting heat from these reservoirs.

If a demand for heat energy cannot be met by the environmental collectors and the heat reservoirs, then the heat pump 8 is put into operation as well. By means of the collection header 5, carrier medium with a high temperature value is supplied to the heat pump 8, and as a result the carrier medium is raised to the required high temperature by the heat pump 8. By means of the collection header 6, carrier medium is supplied to the heat pump 8 at such temperature values as assure its optimal efficiency.

The heat energy produced in the refrigeration system is also recovered and returned to the system. If negative heat energy is output by the collectors A or B (i.e. heat content Q is removed from the system through the collectors A or B when the temperature surrounding the collectors is lower than the temperture of the carrier medium flowing therethrough), then it can be carried to the refrigeration system 9 via the distributors 1 and 2 and the collection header 6 and via the mixing valve 85. It should be noted that "negative heat energy" and a consumer thereof are defined herein as an exchange in which heat content is not withdrawn from the carrier medium (as in radiators and the like) but instead the carrier medium is warmed (cooling systems).

As a result, by means of this system, the disadvantages of the known prior art, residing in the fact that optimal operation is not made possible, are overcome.

Figure 2:
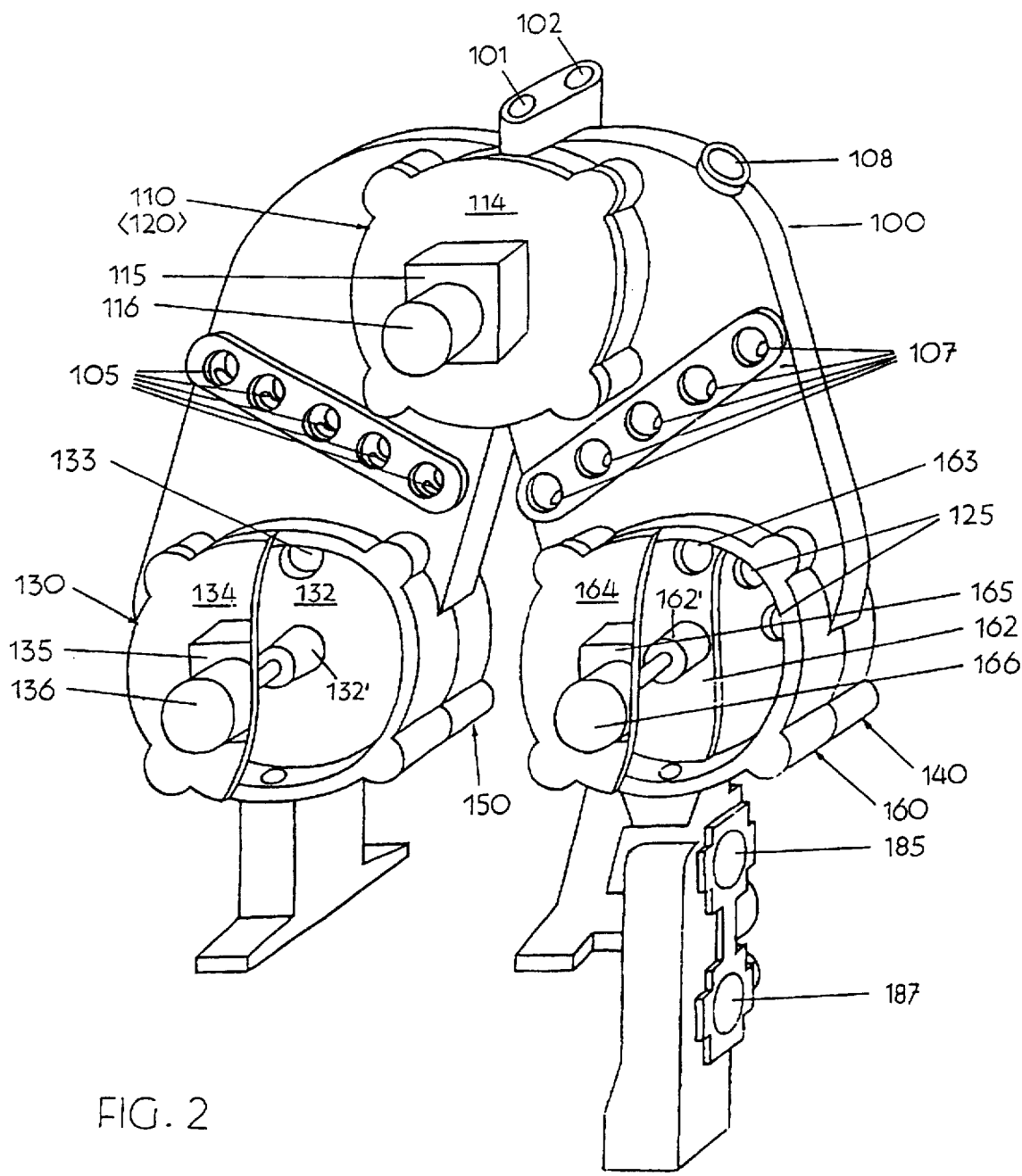
FIG. 2 is a partly broken-away top perspective view of an apparatus according to the invention.
Figure 3:
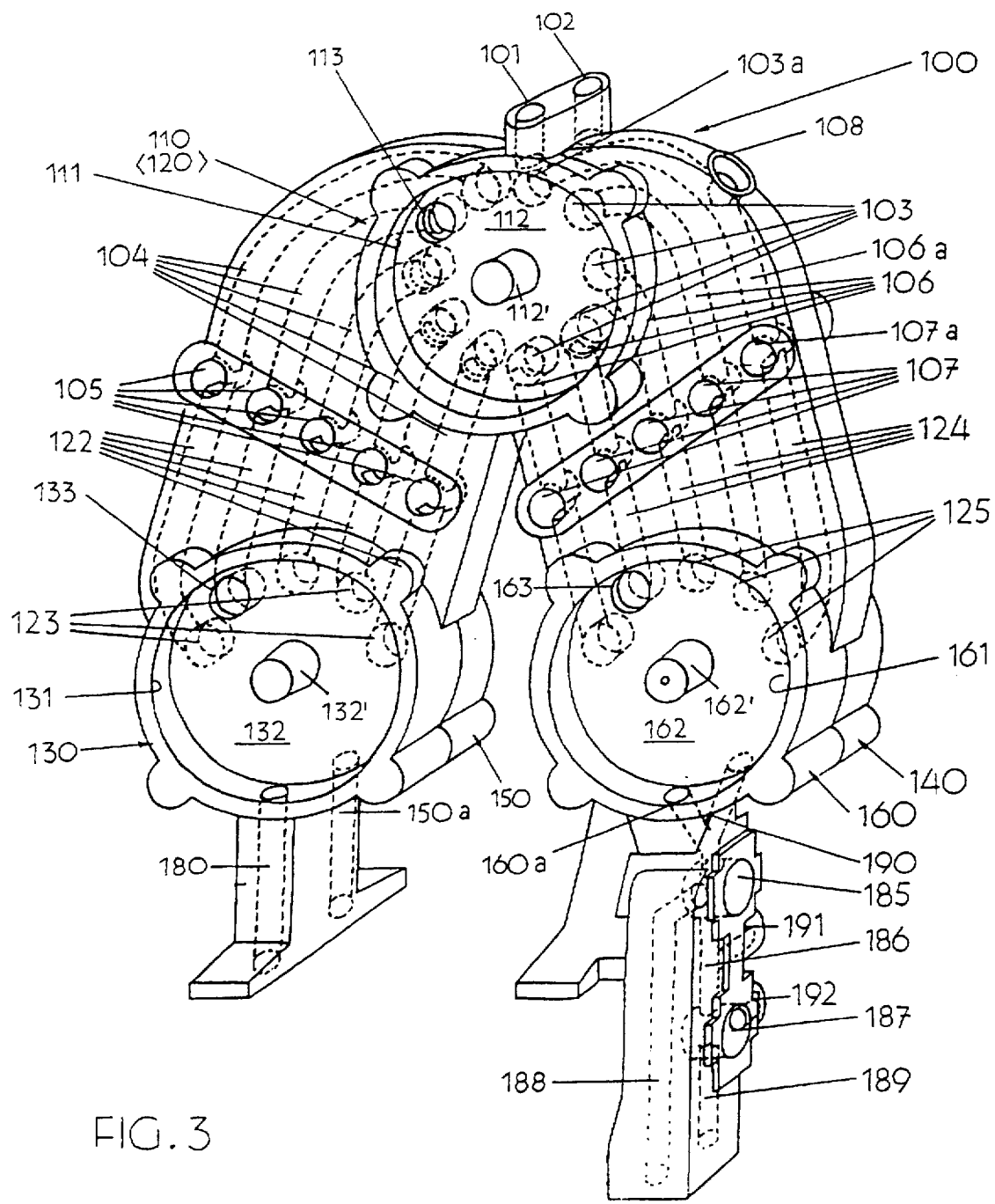
FIG. 3 is a similar view as FIG. 2 with several components omitted and indicating otherwise hidden conduits.

With reference to FIGS. 2 and 3, an apparatus embodying the invention includes the distributors, the collection headers, and the lines required between them. As soon as the connecting lines for the heat sources (e.g. solar collectors), the lines that lead to the consumers of heat energy at different temperature levels and that lead to the heat pump, the ground reservoirs and the refrigeration system are connected to such an apparatus, and in addition as soon as the control motors for the distributors and the collection headers are connected to the central control unit, the entire system is functional.

The apparatus comprises a housing 100, which is embodied on its top with two bores 101 and 102 that serve to connect the lines 10 and 20 that come from the heat collectors, in particular the solar collectors A and B. These bores 101 and 102 lead, via conduits located in the housing 100, to ten transverse bores 103, which in turn discharge into two distributors 110 and 120 that are provided on the front and back of the housing 100 and are located in a symmetrical position with respect to the central plane of the housing 100. Only the front distributor 110 can be seen in the drawing and will be described below. The distributor 120, which is located on the back of the housing 1, has an identical structure.

The distributor 110 has a distributor chamber 111 into which the transverse bores 103 discharge. A rotatably supported disk 112 rests on the rear end face of the distributor chamber 111, in which chamber the transverse bores 103 terminate; the disk is embodied with a single bore 113. The distributor chamber 111 is closed off by a lid 114. Located on the lid 114 are a transmission gear box 115 and a control motor 116. By means of the control motor 116, the disk 112 can be rotated in such a way that its bore 113 is lined up with one of the transverse bores 103.

In the interior of the housing 100, five conduits 104, which lead to five transverse bores 105, and five further conduits 106, which lead to five transverse bores 107, originate at the ten transverse bores 103.

On the front of the housing 100, the flow lines 71–75, which lead to the consumers of heat at a high temperature level, can be connected to the transverse bores 105. The flow lines 76–79', which lead to the consumers of heat at a low temperature level, can be connected to the transverse bores 107. By comparison, on the back of the housing 100, the lines 71a–79a that come from the consumers can be connected to the transverse bores 105 and 107. A line leading to one of the consumers originates at each of the transverse bores 105 and 107, and is returned to the respectively adjacent transverse bore 105 through 107. The last conduit 106a, which connects the transverse bores 103a and 107a, is also embodied with a connection piece 108, to which the lines 10a and 20a that lead back to the heat collectors A and B are connected.

From the transverse bores 105, conduits 122 in the interior of the housing 100 lead to five transverse bores 123, which discharge into a distributor 130, located on the front of the housing 100, and a collection header 150, located on the back of the housing 100. The distributor 130 is in turn embodied with a distributor chamber 131, in which a rotatable disk 132 embodied with a single bore 133 is located. A control motor 136 and an intervening gear box 135 rotate the disk 132. The collection header 150 has the same structure. Leading to the distributor chamber 131 is a conduit 180, to which the line 80 leading away from the condenser 84 of the heat pump 8 can be connected.

A conduit 150a begins at the collector chamber of the collection header 150, and to it the line 50 leading to the condenser 84 of the heat pump 8 can be connected.

Five conduits 124 extend from the transverse bores 107, and discharge into five transverse bores 125 which extend between a second collection header 160 and a third distributor 140. The collection header 160 likewise has a collector chamber 161, a disk 162 with a bore 163, a lid plate 164, a gear box 165, and a control motor 166. The distributor 140 is analogously embodied. Connected to the collection header 160 is a conduit 160a, which leads to a mixing valve 185. Also originating at the mixing valve 185 is a conduit 188, to which the line 88 leading to the heat pump 8 can be connected. From the mixing valve 185, a conduit 186 also leads to a three-way valve 187, at which a conduit 189 begins to which the line leading to the evaporator 81 of the heat pump 8 can be connected. A conduit 190 also begins at the distributor chamber of the distributor 140 and leads to the mixing device 185. A conduit 191 begins at the mixing device 185, and a conduit 192 begins at the three-way valve 187, to both of which conduits the refrigeration system 9 can be connected.

The housing 100 shown in FIGS. 2 and 3 accordingly contains all the devices and connections shown in the diagram of FIG. 1, and as a result, once the connecting lines and the requisite pumps are connected and once the control motors of the distributors 110, 120, 130 and 140 and of the collection headers 150 and 160 are connected to the central control unit the mode of operation explained in conjunction with FIG. 1 can be carried out. This is attained by providing that the disks of the distributors and collection headers are adjusted in such a way that the carrier medium can flow in and out, through one transverse bore each, in such a way that the optimal efficiency of the system sought at the time is attainable.

In order to ensure that the disks 112, 132; 162 can be rotated freely with the control motors 116, 136; 166, respectively, the distributor is first rendered pressureless by closing shutoff valves provided in the system and/or by shutting off the feed pump; as a result, the disks 112, 132; 162 can be rotated into a new position by the respective control motors. As soon as the new position is reached, the disks 112, 132; 162 are again pressed against the back wall of the chambers 111, 131; 161 by means of control cylinders 112', 132'; 162' disposed on the disks, and as a result the requisite sealing is attained with respect to the selected inlet conduit 103, 123; 125.

We claim:

1. A system for supplying consumers with heat energy at relatively different temperature levels, comprising:
   at least one heat source and a carrier medium heated in said heat source;
   at least one distributor having an inlet communicating with said heat source and being formed with a plurality of outlets;
   a plurality of consumers mutually connected in series;
   a plurality of flow lines respectively connected between said outlets of said distributor and said flow lines supplying heat energy to said consumers of heat energy at relatively different temperature levels, said distributor selecting one of the consumers to which said carrier medium heated in said heat source is to be delivered, and whereby said carrier medium flows through said consumers in succession.

2. The system according to claim 1, wherein said at least one heat source is a solar collector.

3. A system for supplying consumers with heat energy at relatively different temperature levels, comprising:
   at least one heat source and a carrier medium heated in said heat source;
   at least one distributor having an inlet communicating with said heat source and being formed with a plurality of outlets;
   a plurality of flow lines respectively connected to said outlets of said distributor, said flow lines supplying heat energy to consumers of heat energy at relatively different temperature levels, said distributor selecting one of the consumers to which said carrier medium heated in said heat source is to be delivered, wherein said at least one heat source is one of an environmental collector and a ground reservoir.

4. The system according to claim 2, wherein said at least one solar collector is one of at least two solar collectors, said at least two solar collectors being aimed in mutually different directions.

5. The system according to claim 1, wherein said at least one heat source is one of a plurality of heat sources, one of said heat sources being a heat pump.

6. The system according to claim 1, which further comprises a collection header formed with a single outlet line and with inlets connected to inlet lines from consumers at a relatively low temperature level, a heat pump having an inlet communicating with said single outlet line of said collection header, wherein said collection header defines the respective consumer to be connected to said inlet of said heat pump.

7. The system according to claim 6, including a further collection header, said heat pump including an evaporator selectively communicating with the return lines from the consumers of heat energy at the relatively low temperature level via said collection header, and said heat pump further including a condenser selectively communicating with the return lines from the consumers of heat energy at a relatively high temperature level via said further collection header.

8. The system according to claim 5, which further comprises a further distributor having an inlet communicating with an outlet of said heat pump, said further distributor being formed with a plurality of outlets leading to consumers at a relatively high temperature level, said further distributor selectively supplying carrier medium from said heat pump to one of the consumers at the relatively high temperature level.

9. The system according to claim 8, wherein said heat pump includes an evaporator, a compressor, and a condenser, said evaporator communicating with a consumer for negative heat energy.

10. The system according to claim 9, which further comprises another distributor having an inlet communicating with a return line of a consumer of negative heat energy, said other distributor having a plurality of outlets communicating with consumers at the relatively low temperature level, said other distributor selectively connecting one of the consumers at the relatively low temperature level for receiving the carrier medium heated in the consumer of negative heat energy.

11. The system according to claim 10, wherein said plurality of heat sources include an environmental collector, and the system further comprises a mixing valve connected in the return line of the consumer of negative heat energy, said mixing valve further communicating with said environmental collector and with said evaporator of said heat pump.

12. A system for supplying a plurality of consumers with heat energy, comprising: at least one heat source, a carrier medium heated in the heat source, a plurality of flow lines for supplying heat energy to consumers of heat energy at relatively different temperature levels, and flow lines connecting said consumers in series;

a distributor assembly for selectively supplying the heat energy to the consumers, said distributor assembly including a housing formed with at least one inlet for receiving the carrier medium from said at least one heat source and with a plurality of outlets connected to said flow lines for the consumers of heat at relatively different temperature levels, at least one distributor connected between said at least one inlet and said plurality of outlets, and a control device operatively connected to said distributor for selectively connecting said inlet with one of said outlet conduits, such that the carrier medium flows from said one outlet conduit to a respective one of said consumers and in series through at least one other of said consumers.

13. The distributor assembly according to claim 12, wherein said control device includes a rotatable disk having a bore formed therein, and a control motor rotating said disk, said control motor being means for selecting one of said inlet conduits.

14. The distributor assembly according to claim 13, which further comprises a control cylinder connected to said rotatable disk, said control cylinder, following a rotation of said disk, sealingly placing said disk against a respectively selected inlet conduit.

15. In combination with a system for supplying consumers with heat energy, wherein the system includes at least one heat source, a carrier medium heated in the heat source, and a plurality of consumers of heat energy receiving the carrier medium at relatively different temperature levels;

a collector assembly, comprising:
a housing formed with a plurality of inlet conduits for receiving the carrier medium from the consumers of heat energy and with an outlet conduit leading to a heat pump, at least one collection header connected between said inlet conduits and said outlet conduit, and a control device associated with said collection header for selectively defining one of said inlet conduits to be connected for supplying the carrier medium to the heat pump.

16. The collector assembly according to claim 15, wherein said control device includes a rotatable disk having a bore formed therein, and a control motor rotating said disk, said control motor being means for selecting one of said inlet conduits to be connected with said outlet conduit.

17. The distributor assembly according to claim 16, which further comprises a control cylinder connected to said rotatable disk, said control cylinder, following a rotation of said disk, sealingly placing said disk against a respectively selected inlet conduit.

18. An apparatus for controlling the supply of heat energy to consumers with a heated carrier medium, comprising: a housing formed with fluidic connections for receiving heated carrier medium from at least one heat source and for supplying the heated carrier medium to a plurality of consumers of heat energy, at least one distributor disposed in said housing and connected between the fluidic connections for receiving and supplying the carrier medium, said distributor selecting a particular conduit through which the heated carrier medium is supplied to one of the plurality of consumers, and including at least one collection header disposed in said housing, said collection header being formed with an outlet to be connected to a heat pump.

19. The apparatus according to claim 18, wherein said distributor is one of four distributors disposed in said housing, and said collection header is one of two collection headers, said distributors and said collection headers being connected to one another through conduits and are connected to heat sources and to consumers of heat energy and negative heat energy respectively via connecting bores, said distributors and said collection headers controlling a distribution of heat energy and negative heat energy to and from the consumers with a carrier medium flowing in from said heat sources.

* * * * *